United States Patent
Lee et al.

(10) Patent No.: US 8,300,705 B2
(45) Date of Patent: Oct. 30, 2012

(54) METHOD FOR GENERATING AND PROCESSING HIERARCHICAL PES PACKET FOR DIGITAL SATELLITE BROADCASTING BASED ON SVC VIDEO

(75) Inventors: In Ki Lee, Busan (KR); Dae Ig Chang, Daejeon (KR); Kwang Deok Seo, Gangwon-do (KR); Won Sup Chi, Gangwon-do (KR)

(73) Assignees: Electronics and Telecommunications Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 367 days.

(21) Appl. No.: 12/631,989

(22) Filed: Dec. 7, 2009

(65) Prior Publication Data

US 2010/0142625 A1    Jun. 10, 2010

(30) Foreign Application Priority Data

Dec. 8, 2008 (KR) .................. 10-2008-0124294
Apr. 10, 2009 (KR) .................. 10-2009-0031312

(51) Int. Cl.
*H04N 11/02* (2006.01)
(52) U.S. Cl. .................................. 375/240.26
(58) Field of Classification Search ......... 375/240.12–240.13, 240.26; 370/469
See application file for complete search history.

(56) References Cited

U.S. PATENT DOCUMENTS

| | | | |
|---|---|---|---|
| 7,742,524 B2 * | 6/2010 | Jeon et al. ............... | 375/240.13 |
| 2006/0056455 A1 * | 3/2006 | Ruiz Floriach et al. ...... | 370/469 |
| 2007/0121723 A1 * | 5/2007 | Mathew et al. .......... | 375/240.12 |
| 2009/0225870 A1 * | 9/2009 | Narasimhan ............. | 375/240.26 |
| 2011/0122945 A1 * | 5/2011 | Li et al. .................... | 375/240.12 |

OTHER PUBLICATIONS

Stephan Wenger, et al; "Transport and Signaling of SVC in IP Networks", IEEE Transactions on Circuits and Systems for Video Technology, vol. 17, No. 9, Sep. 2007, pp. 1164-1173 (No exact date given).

* cited by examiner

*Primary Examiner* — David Czekaj
*Assistant Examiner* — Leron Beck
(74) *Attorney, Agent, or Firm* — Ladas & Parry LLP

(57) ABSTRACT

A method for generating and processing a hierarchical packetized elementary stream (PES) packet for digital satellite broadcasting based on SVC (Scalable Video Coding) video is disclosed. That is, when SVC video is applied to a digital satellite broadcasting system, a transmitter side can generate a hierarchical PES packet in consideration of a hierarchical structure of SVC video and a receiver side can effectively process a received hierarchical PES packet.

5 Claims, 5 Drawing Sheets

METHOD FOR GENERATING AND PROCESSING HIERARCHICAL PES PACKET FOR DIGITAL SATELLITE BROADCASTING BASED ON SVC VIDEO

CROSS-REFERENCE TO RELATED APPLICATIONS

This application claims the priorities of Korean Patent Application Nos. 10-2008-0124294 filed on Dec. 8, 2008, and 10-2009-0031312 filed on Apr. 10, 2009, in the Korean Intellectual Property Office, the disclosures of which are incorporated herein by reference.

BACKGROUND OF THE INVENTION

1. Field of the Invention

The present invention relates to a method for generating and processing a hierarchical packetized elementary stream (PES) packet for digital satellite broadcasting based on SVC (Scalable Video Coding) video and, more particularly, to a technique allowing a transmitter side to generate a hierarchical PES packet in consideration of a hierarchical structure of SVC video and a receiver side to effectively process a received hierarchical PES packet when the SVC video is applied to a digital satellite broadcast system.

2. Description of the Related Art

SVC, an encoding technique which is an extension of the H.264 video compression standard, is an extended encoding scheme developed at the end of 2007 in order to solve problems such as a low compression efficiency, an inability in supporting complex scalability, and a high implementation complexity of the layer encoding-based scalability attempted by the conventional MPEG-2, MPEG-4, and the like.

SVC encodes several video layers into a single bit stream, and the layers of the SVC include a single base layer (BL) and a plurality of enhancement layers (EL) that can be successively accumulated on the base layer. Each enhancement layer may represent a maximum bit rate, a frame rate, and even the resolution of each layer based on lower layer information.

In the SVC, as more enhancement layers are accumulated, various bit rates, frame rates and resolution can be supported, whereby a diversity problem regarding a bandwidth, a diversity problem regarding the performance and resolution of a receiver terminal, a diversity problem regarding the preference of the content's consumers, and the like, can be collectively solved. In this sense, the SVC is an encoding technique suitable for a multimedia contents service in a universal multimedia access (UMA) environment.

Meanwhile, digital satellite broadcasting is greatly affected, in the aspect of a service environment, by weather conditions such as rainfall, so a method for solving this problem must be formulated. Thus, attempts at applying the SVC encoding scheme, which can provide an adaptive video service to various environments, to a DVB-S2-based digital satellite broadcasting system are being made.

To this end, a technique for effectively generating and processing a PES packet in consideration of a hierarchical structure of SVC video is required.

SUMMARY OF THE INVENTION

An aspect of the present invention provides a method for generating, by a transmitter side, a hierarchical PES packet in consideration of a hierarchical structure of SVC video and a method for processing, by a receiver side, a received hierarchical PES packet, when the SVC video is applied to a digital satellite broadcasting system.

According to an aspect of the present invention, there is provided a method for generating a hierarchical PES packet, including: grouping a plurality of base layer (BL) network abstraction layer (NAL) units included in a single group of picture (GOP) to generate a base layer PES packet; and grouping enhancement layer (EL) NAL units associated with each of the plurality of BL NAL units to generate a plurality of EL PES packets, wherein index numbers are allocated to the plurality of BL NAL units according to an extracted order, and the same index number as that of each associated BL NAL unit is allocated to each of the plurality of EL PES packets associated with each of the plurality of BL NAL units.

A header, which includes a GOP ID field storing GOP identification information, a layer ID field storing PES payload layer information; a BL header length field storing the length of an added header; a BL size field storing the size of the BL NAL unit; and a BL index field storing BL NAL unit index information, may be added to a payload of the BL PES packet.

A header, which includes a GOP ID field storing GOP identification information, a layer ID field storing PES payload layer information; and a BL index field storing the same index information as that of the BL NAL unit associated with the EL PES packet, may be added to a payload of the EL PES packet.

According to another aspect of the present invention, there is provided a method for processing a hierarchical PES packet, including: when a base layer (BL) PES packet is reconfigured, separating each BL NAL unit from the BL PES packet; storing the separated BL NAL units in a buffer according to the order of their index number; when an enhancement layer (EL) PES packet having an index N is reconfigured, transferring the BL NAL units having the index N from the buffer to a decoder; and extracting the EL NAL units from the EL PES packet having the index N in turns and transferring the extracted EL NAL units to the decoder.

The transferring of the BL NAL unit to the decoder and the extracting the EL NAL units in turns and the transferring of the extracted EL NAL units to the decoder may be repeatedly performed in the order of index numbers until such time as SVC video decoding on a single GOP is completed, starting from an EL PES packet having an index 1.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
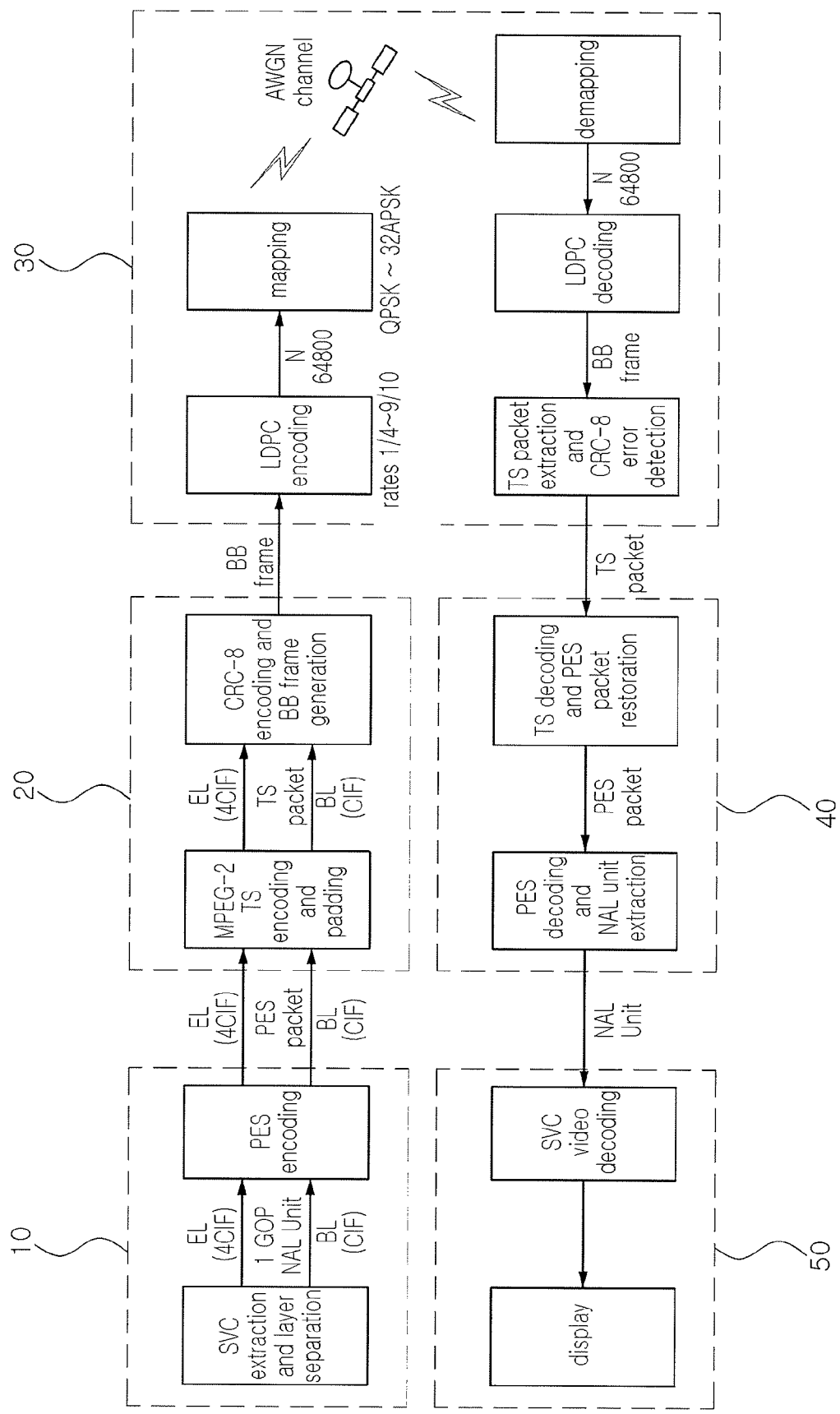
FIG. 1 is a schematic block diagram of an SVC video-based digital satellite broadcasting system.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of an SVC video-based digital satellite broadcasting system.

With reference to FIG. 1, in a scalable video coding (SVC) video-based digital satellite broadcasting system, first, network abstraction layer (NAL) units belonging to a base layer and an enhancement layer are discriminately extracted from an SVC bit stream, and packetized elementary stream (PES) packets are generated by layers from the extracted NAL units (10). In this case, the base layer can represent a resolution of common image format (CIF) (352 pixels×288 lines) standard to provide a low resolution broadcast service, and the enhancement layer can represent a resolution of 4CIF (704 pixels×576 lines) standard to provide a high resolution broadcast service.

The PES packets are divided into MPEG-2 TS (Transport Stream) packets and then converted into a BB (Baseband) frame (20). The BB frame undergoes low density parity check (LDPC) encoding, which is then transmitted (30).

The LDPC encoding is an error correction scheme for coping with a problem of availability degradation due to rainfall or clouds while a satellite broadcast service is being provided. In an exemplary embodiment of the present invention, in order to perform unequal error protection (UEP) on the base layer and enhancement layer video through LDPC encoding, SVC video is divided by the base layer and the enhancement layer and then PES-packetized at a transmitter side.

In detail, without the base layer, the enhancement layer is useless, so base layer information is of paramount significance in any case, when compared with information regarding the enhancement layer. Thus, the availability of the satellite broadcast service can be effectively enhanced by unequally applying LDPC encoding to the base layer and to the enhancement layer. To this end, the SVC video must be PES-packetized in such a form that the base layer and the enhancement layer are separated.

The method of generating a hierarchical PES packet and the method of processing the same according to an exemplary embodiment of the present invention will now be described with reference to FIGS. 2 to 5. In this case, the method of generating a hierarchical PES packet and the method of processing the same according to an exemplary embodiment of the present invention are performed in 'PES encoding' and 'PES decoding' illustrated in FIG. 1, respectively.

Figure 2:
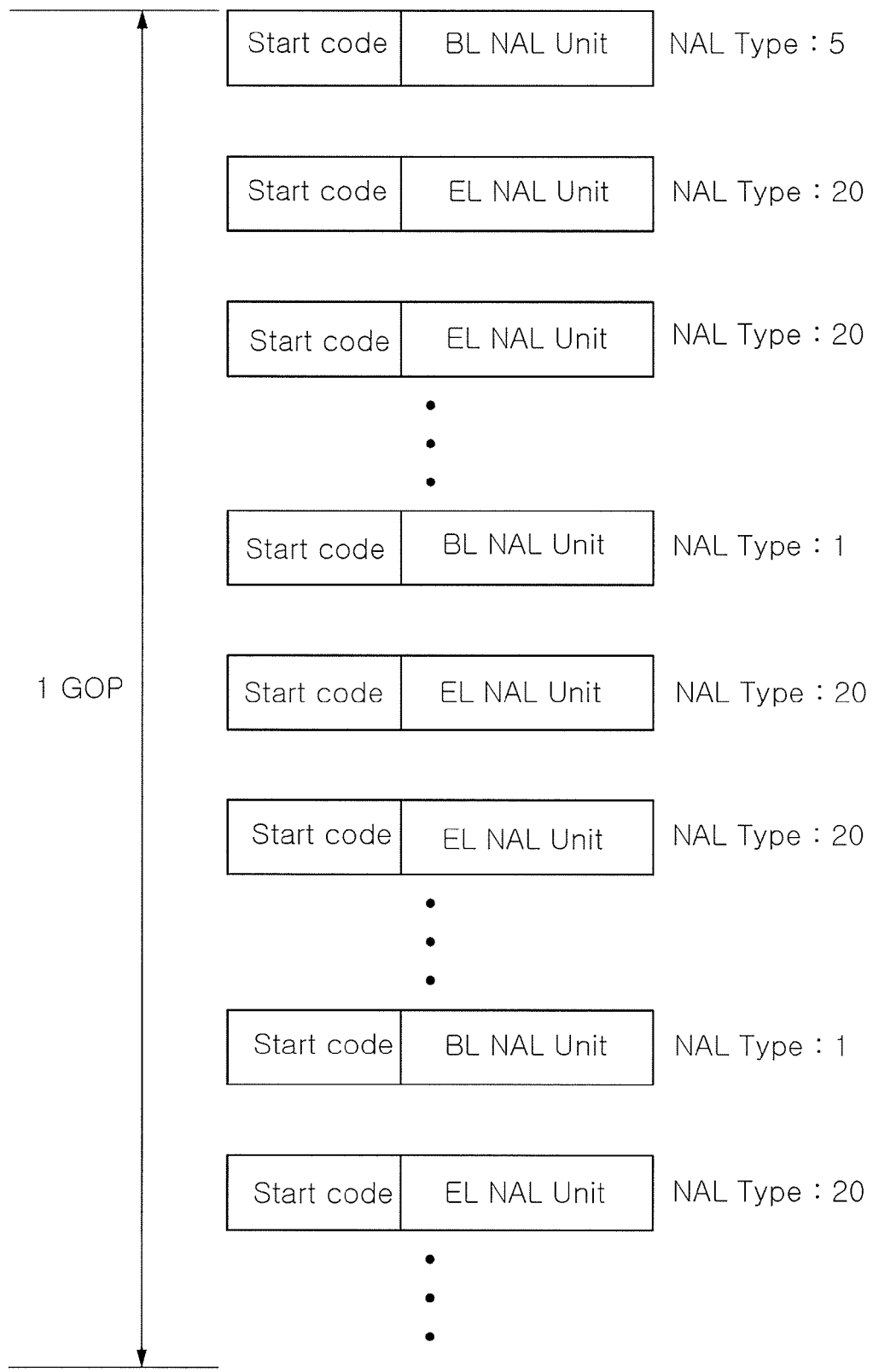
FIG. 2 illustrates the order of NAL units within a single GOP after SVC extraction.

FIG. 2 illustrates the order of NAL units within a single group of picture (GOP) after SVC extraction.

Each picture included in a single GOP includes a single NAL unit belonging to the base layer and a plurality of NAL units belonging to the enhancement layer. In this case, an NAL type of the NAL unit (BL NAL unit) belonging to the base layer is 1 or 5, and that of the NAL units (EL NAL units) belonging to the enhancement layer is 20. The NAL unit of the NAL type 5 is a BL NAL unit belonging to an instantaneous decoding refresh (IDR) picture, and the NAL unit of NAL type 1 is a BL NAL unit belonging to a picture other than the IDR picture.

As shown in FIG. 2, after SVC extraction, a plurality of EL NAL units belonging to the same picture are positioned next to each BL NAL unit. In this case, however, when the BL NAL unit and the EL NAL units are separated from the NAL units extracted in this order, PES-packetized, and then transmitted, a receiver side must perform a process of reordering (i.e., rearranging, realigning) the NAL units in the original order as shown in FIG. 2, causing overheads and processing delays.

Thus, the present invention proposes the method of generating and processing a hierarchical PES packet in order to minimize the overheads and the processing delays according to the NAL unit reordering process at the receiver side.

Figure 3:
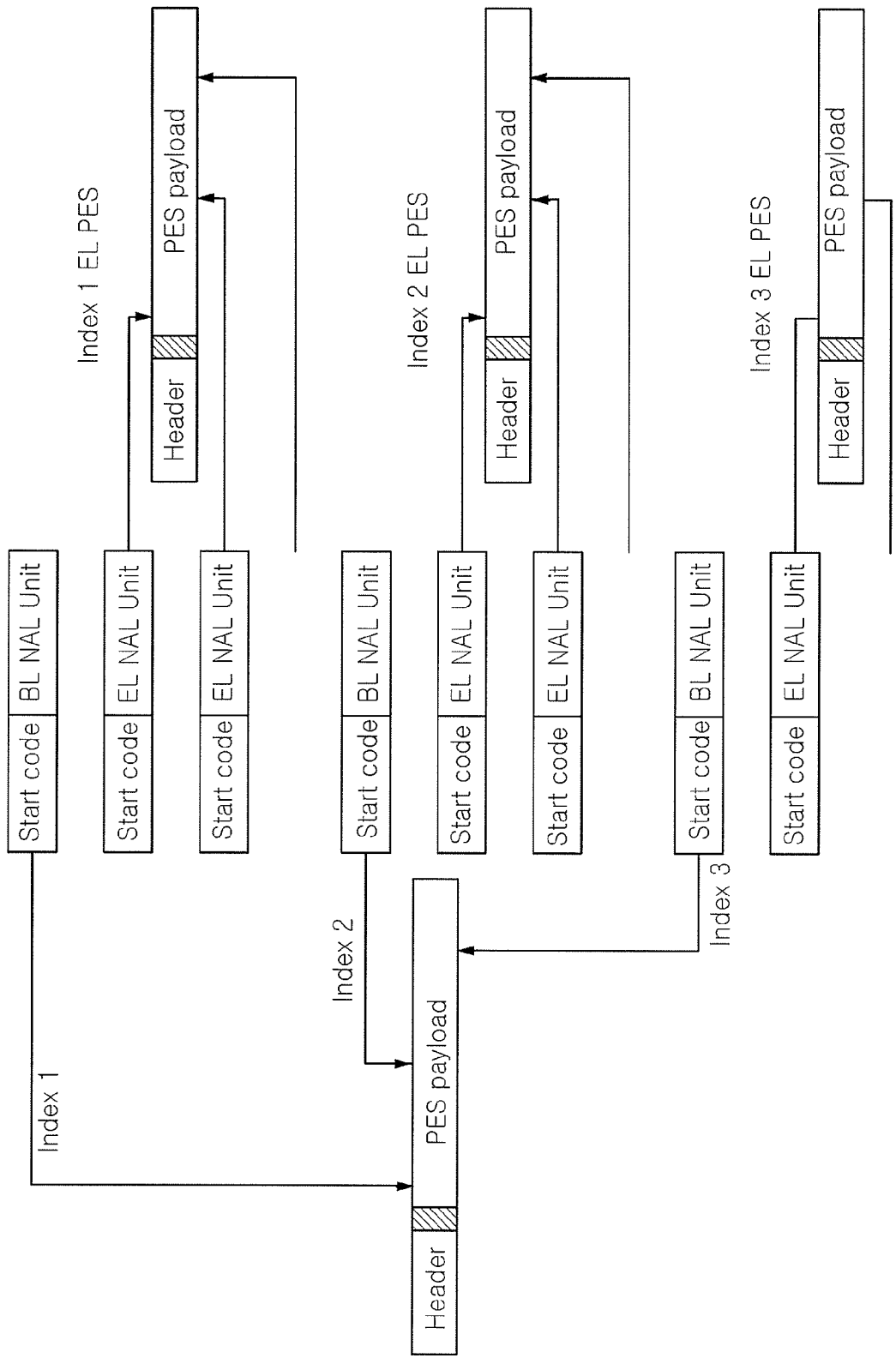
FIG. 3 illustrates a method of generating, by a transmitter side, PES packet by separating the NAL units of a base layer and an enhancement layer by GOP units according to an exemplary embodiment of the present invention.

FIG. 3 illustrates a method of generating, by a transmitter side, a PES packet by separating NAL units contained within a base layer and an enhancement layer by GOP units.

In an exemplary embodiment of the present invention, the BL NAL units whose NAL type is 1 or 5 are grouped to generate a base layer (BL) PES packet, and EN NAL units associated with a single BL NAL unit are grouped to generate an enhancement layer (EL) PES packet. In this case, an index is used to identify an EL PES packet generated by grouping the EL NAL units associated with a particular base layer.

In other words, the EL NAL units associated with each BL NAL unit are allocated the same index number as that of each BL NAL unit, and configured as the EL PES packet. In this case, head information as shown in FIG. 4 is added to a shaded portion of a PES payload of the BL PES packet and the EL PES packet.

For example, a BL NAL unit having an index 1 in the BL PES packet and EL NAL units included in the EL PES packet having the index 1 are NAL units belonging to the same picture. Accordingly, in performing PES decoding, the BL NAL units and the EL NAL units can have a mutual hierarchical connection based on the information of 'index 1'.

Figure 4:
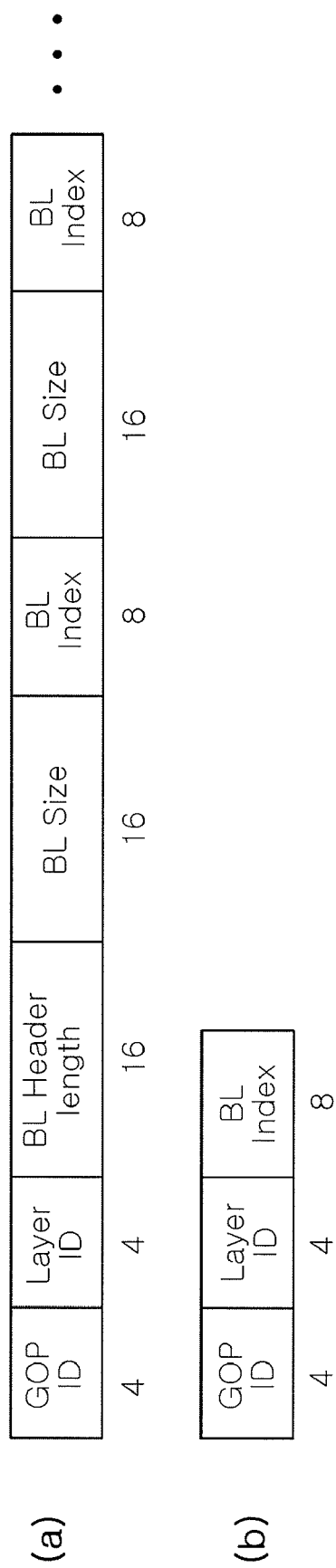
FIG. 4 illustrates the configuration of a header added to a hierarchical PES packet generated according to an exemplary embodiment of the present invention.

FIG. 4 illustrates the configuration of the header added to the hierarchical PES packet generated according to an exemplary embodiment of the present invention. Specifically, FIG. 4(a) shows the configuration of the header added to the BL PES packet, and FIG. 4(b) shows the configuration of the header added to the EL PES packet.

As shown in FIG. 4, the header added to the BL PES packet includes the fields of a GOP ID (4 bits), a layer ID (4 bits), a BL header length (16 bits), a BL size (16 bits), a BL index (8 bits), and the header added to the EL PES packet includes the fields of a GOP ID (4 bits), a layer ID (4 bits), a BL index (8 bits), and the following information is stored in each field.

GOP ID: GOP identification information
Layer ID: PES payload layer information
BL header length: Length of added header (bytes)
BL size: Size of BL NAL unit (bytes)
BL index: Index information of BL NAL unit As for the hierarchical PES packets generated according to the method as described above, the EL PES packets are sequentially generated as MPEG-2 TS packets according to the index number order, starting from the BL PES packet. Different coding rates are applied to base layer data and enhancement layer data separated into PES packets by layers according to the importance of each in the LDPC encoding process, thus enabling unequal packet protection.

Meanwhile, the receiver side reconfigures the hierarchical PES packets from the received TS packets, extracts the NAL units from the reconfigured hierarchical PES packets, and transfers the extracted NAL units to an SVC video decoding unit.

Figure 5:
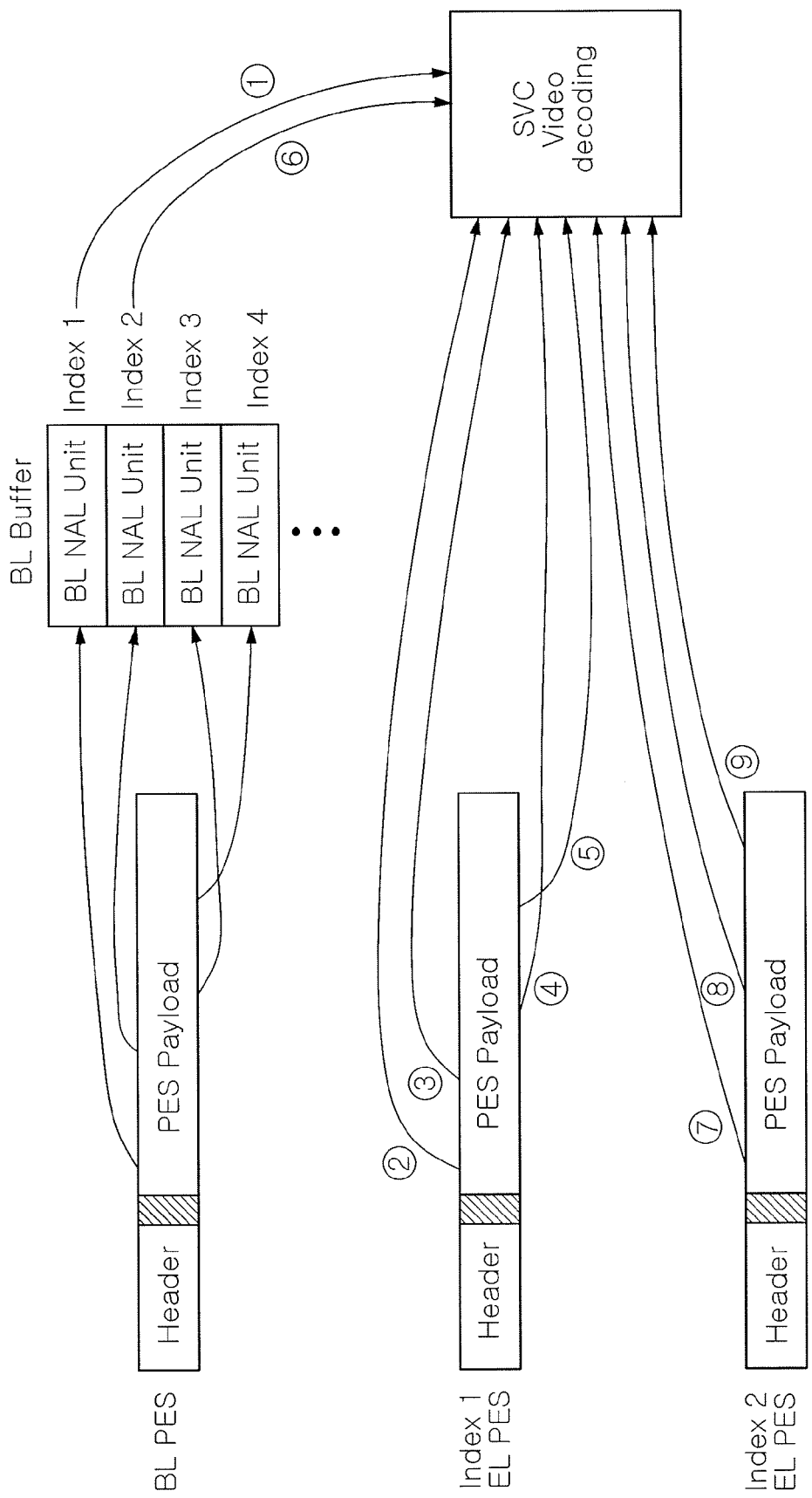
FIG. 5 illustrates the order of extracting, by a receiver side, NAL units from reconfigured hierarchical PES packets according to an exemplary embodiment of the present invention.

FIG. 5 illustrates the order of extracting, by the receiver side, the NAL units from the reconfigured hierarchical PES packets according to an exemplary embodiment of the present invention.

First, when the BL PES packet is reconfigured, each BL NAL unit is separated from the BL PES Packet by using the header information added to the payload of the BL PES packet, and the separated BL NAL units are stored in a BL buffer according to the index number order.

Next, when the EL PES packet having the index 1 is reconfigured, the BL buffer transfers the BL NAL unit having the index 1 to an SVC video decoding unit, extracts the EL NAL units from the EL PES packet having the index 1 in turns, and transfers the extracted EL NAL units to the SVC video decoding unit.

Thereafter, indexes 2, 3, . . . are also processed in the same manner as the index 1. In other words, when the EL PES packet having the index 2 is reconfigured, the BL buffer transfers BL NAL units having the index 2 to the SVC video decoding unit, extracts the EL NAL units from the EL PES packet having the index 2 in turns, and transfers the extracted EL NAL units to the SVC video decoding unit.

Such NAL unit extraction process is repeatedly performed in the index number order until such time as the SVC video decoding with respect to the single hierarchical GOP is completed.

As set forth above, according to exemplary embodiments of the invention, the NAL units of the base layer and the enhancement layer are separated and PES-packetized in consideration of the hierarchical structure of the SVC video, thus discriminating an LDPC encoding rate by the layers, whereby packet protection can be discriminated to thus implement a digital satellite broadcast system with an improved availability.

In addition, In the digital satellite broadcast system, the transmitter side can minimize overhead in generating PES packets by separating the base layer and the enhancement layer, and the receiver side does not need to re-arrange the NAL units according to the decoding order for the purpose of SVC decoding, thus reducing a process delay time.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for generating a hierarchical PES packet, the method comprising:
    grouping a plurality of base layer (BL) network abstraction layer (NAL) units included in a single group of picture (GOP) to generate a base layer PES packet;
    grouping enhancement layer (EL) NAL units associated with each of the plurality of BL NAL units to generate a plurality of EL PES packets,
    wherein index numbers are allocated to the plurality of BL NAL units according to an extracted order, and the same index number as that of each associated BL NAL unit is allocated to each of the plurality of EL PES packets associated with each of the plurality of BL NAL units,
    wherein the plurality of EL PES packets are sequentially generated as MPEG-2 Transport Stream packets according to the index numbers, and different coding rates are applied to BL data and EL data separated into PES packets by layers according to the importance of each in a low density parity check (LDPC) encoding process, thus enabling unequal packet protection;
    when the BL PES packet is reconfigured, separating each BL NAL unit from the BL PES packet;
    storing the separated BL NAL units in a buffer according to the order of their index numbers;
    when the EL PES packet having an index N is reconfigured, transferring the BL NAL units having the index N from the buffer to a decoder, and
    extracting the EL NAL units from the EL PES packet having the index N in turns and transferring the extracted EL NAL units to the decoder,
    wherein the transferring of the BL NAL unit to the decoder and the extracting the EL NAL units in turns and the transferring of the extracted EL NAL units to the decoder are repeatedly performed in the order of index numbers until such time as SVC video decoding on a single GOP is completed, starting from an EL PES packet having an index 1.

2. The method of claim 1, wherein a header, which includes a GOP ID field storing GOP identification information, a layer ID field storing PES payload layer information; a BL header length field storing the length of an added header; a BL size field storing the size of the BL NAL unit; and a BL index field storing index information of the BL NAL unit, is added to a payload of the BL PES packet.

3. The method of claim 1, wherein a header, which includes a GOP ID field storing GOP identification information, a layer ID field storing PES payload layer information; and a BL index field storing the same index information as that of the BL NAL unit associated with the EL PES packet, is added to a payload of the EL PES packet.

4. A method for processing a hierarchical PES packet, the method comprising:
    when a base layer (BL) PES packet is reconfigured, separating each BL NAL unit from the BL PES packet;
    storing the separated BL NAL units in a buffer according to the order of their index numbers;
    when an enhancement layer (EL) PES packet having an index N is reconfigured, transferring the BL NAL units having the index N from the buffer to a decoder; and
    extracting the EL NAL units from the EL PES packet having the index N in turns and transferring the extracted EL NAL units to the decoder,
    wherein the transferring of the BL NAL unit to the decoder and the extracting the EL NAL units in turns and the transferring of the extracted EL NAL units to the decoder are repeatedly performed in the order of index numbers until such time as SVC video decoding on a single GOP is completed, starting from an EL PES packet having an index 1.

5. A method for processing a hierarchical PES packet, the method comprising:
    when a base layer (BL) PES packet is reconfigured, separating each BL NAL unit from the BL PES packet;
    storing the separated BL NAL units in a buffer according to the order of their index numbers;
    when an enhancement layer (EL) PES packet having an index N is reconfigured, transferring the BL NAL units having the index N from the buffer to a decoder; and
    extracting the EL NAL units from the EL PES packet having the index N in turns and transferring the extracted EL NAL units to the decoder,
    wherein the transferring of the BL NAL unit to the decoder and the extracting the EL NAL units in turns and the transferring of the extracted EL NAL units to the decoder are repeatedly performed in the order of index numbers until such time as SVC video decoding on a single GOP is completed, starting from an EL PES packet having an index 1,
    wherein a receiver side does not need to re-arrange the NAL units according to the decoding order, and a process delay time is reduced.

* * * * *